O. MALCHER.
COMPUTING AND RECORDING SCALE.
APPLICATION FILED MAR. 17, 1915.

1,335,068.

Patented Mar. 30, 1920.
10 SHEETS—SHEET 1.

Witnesses:
Inventor:
Otto Malcher

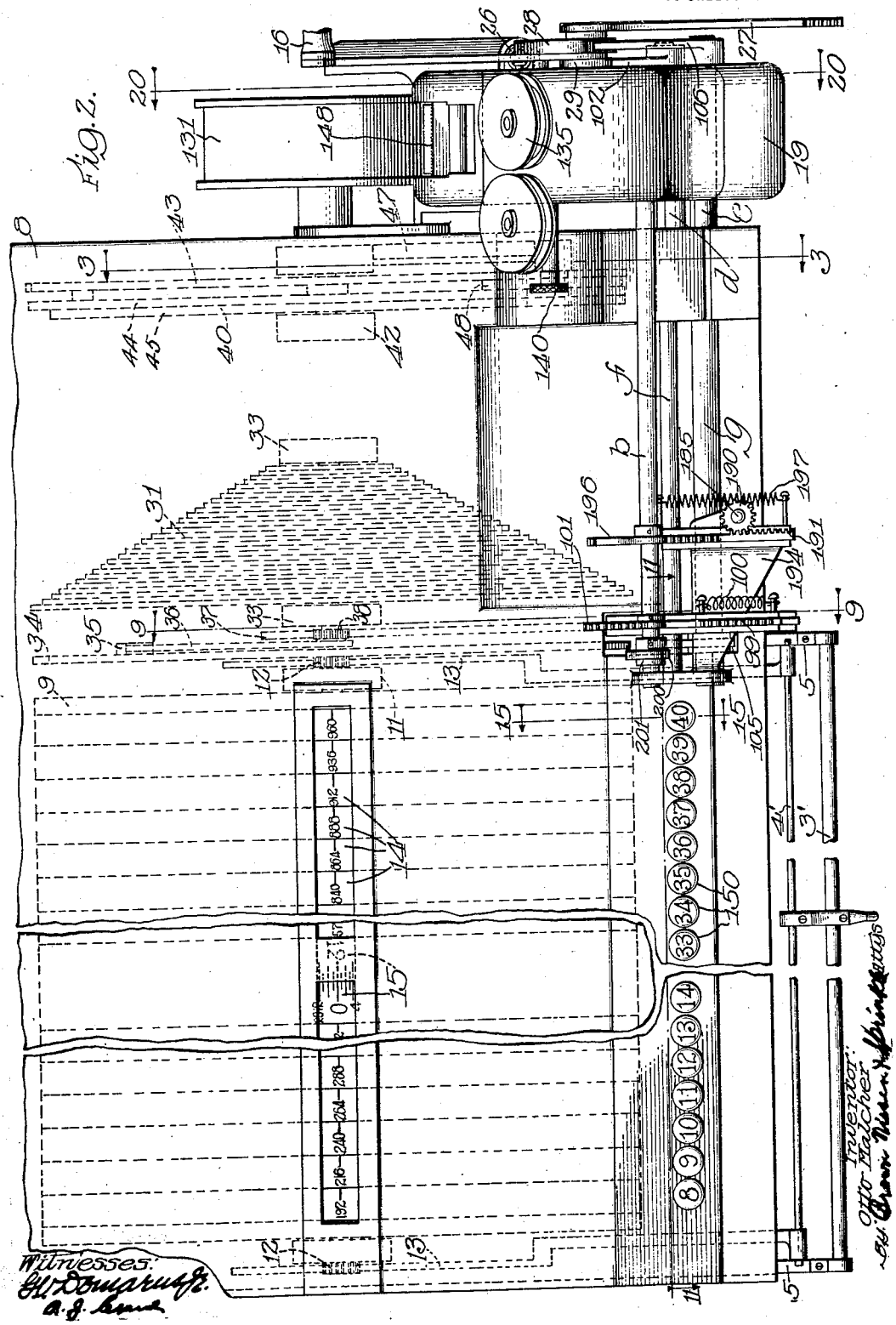

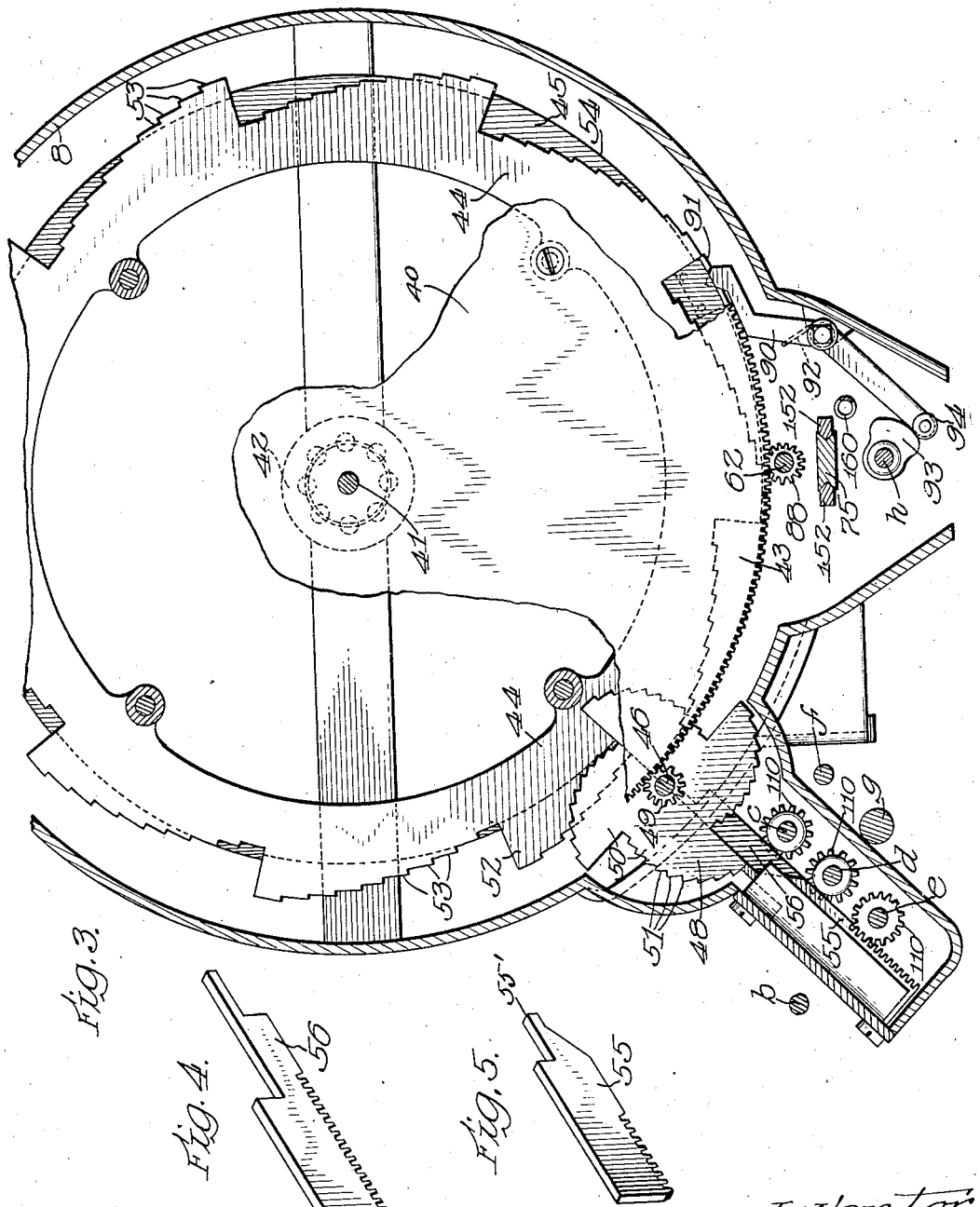

O. MALCHER.
COMPUTING AND RECORDING SCALE.
APPLICATION FILED MAR. 17, 1915.
1,335,068.
Patented Mar. 30, 1920.
10 SHEETS—SHEET 4.
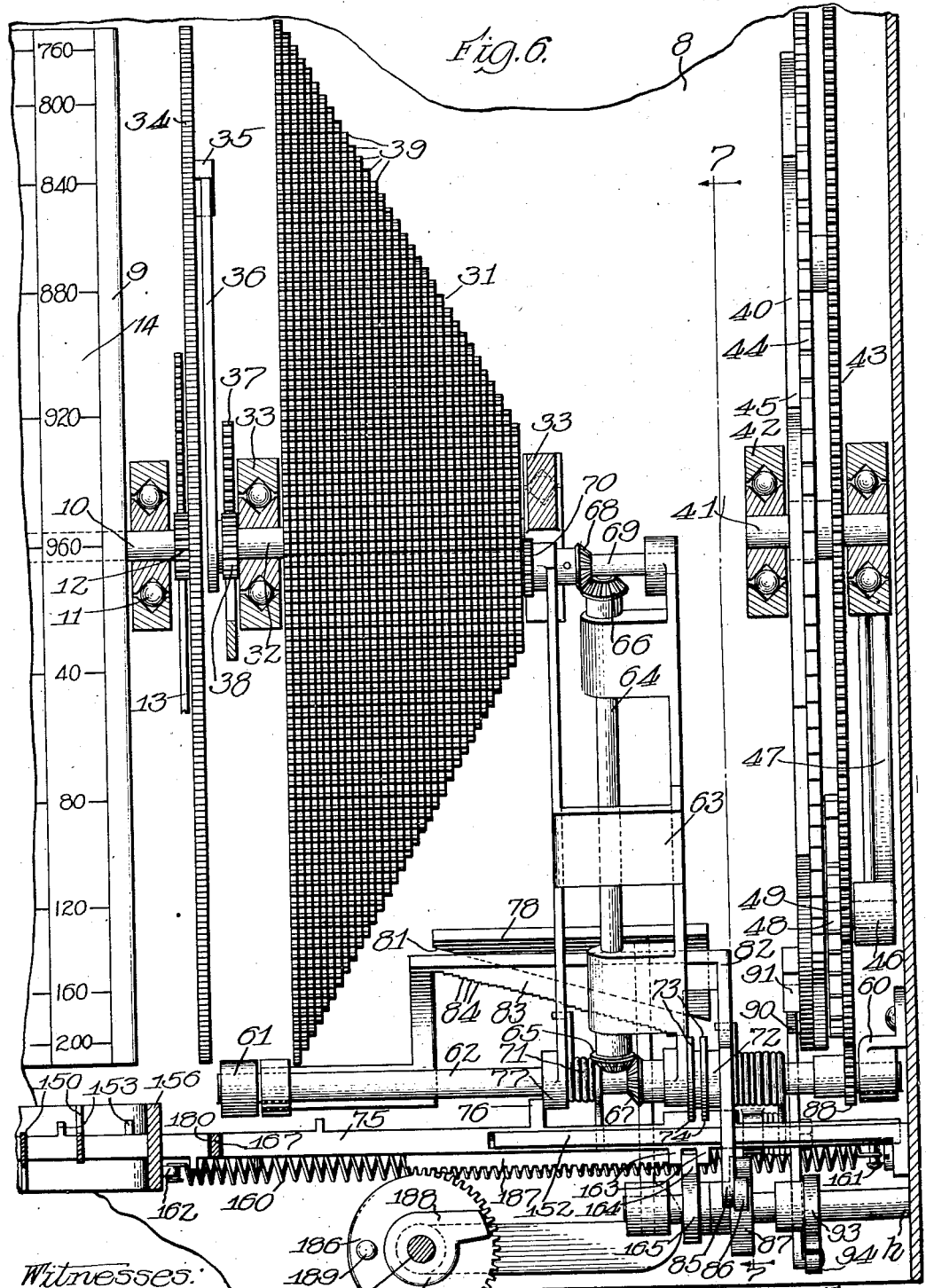

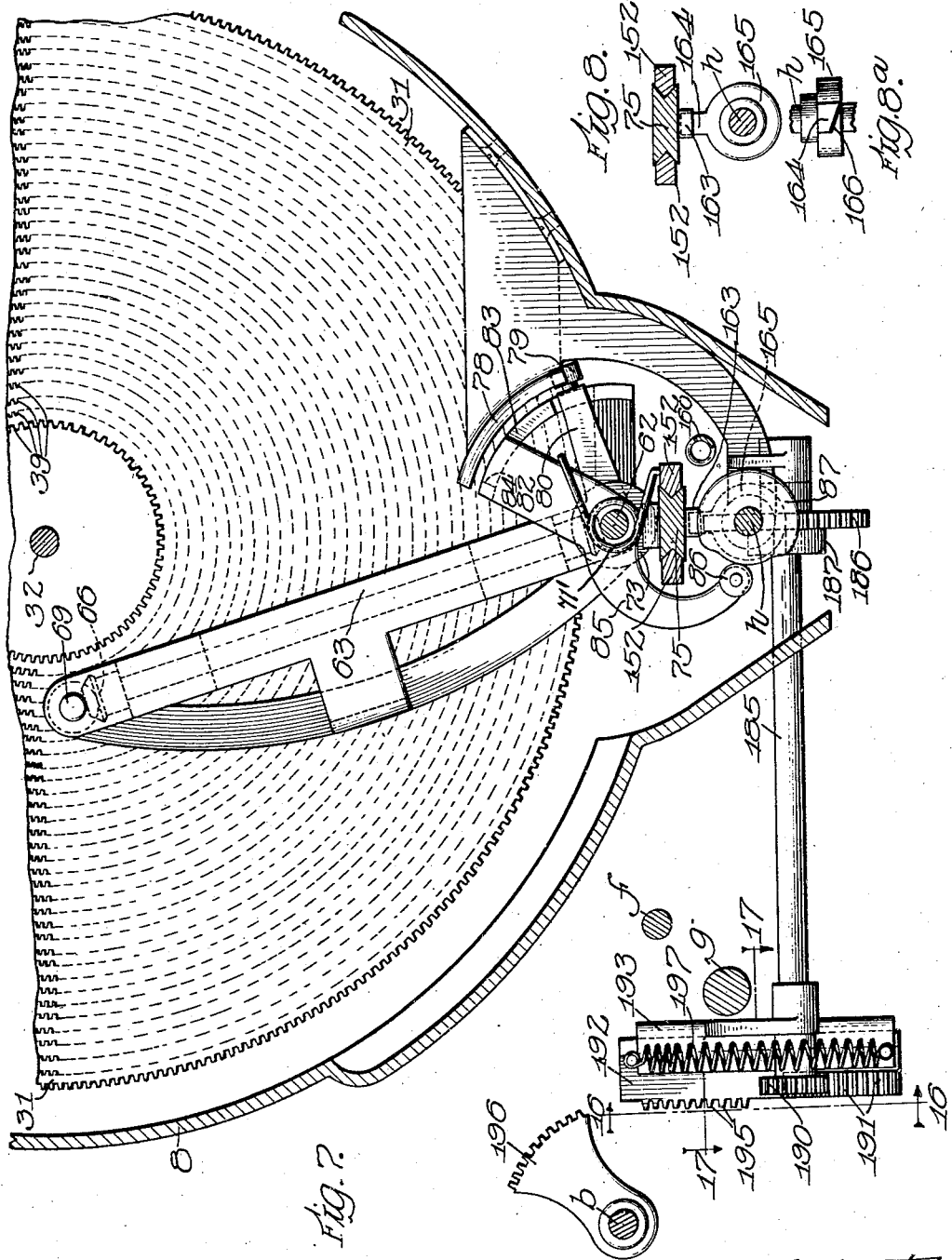

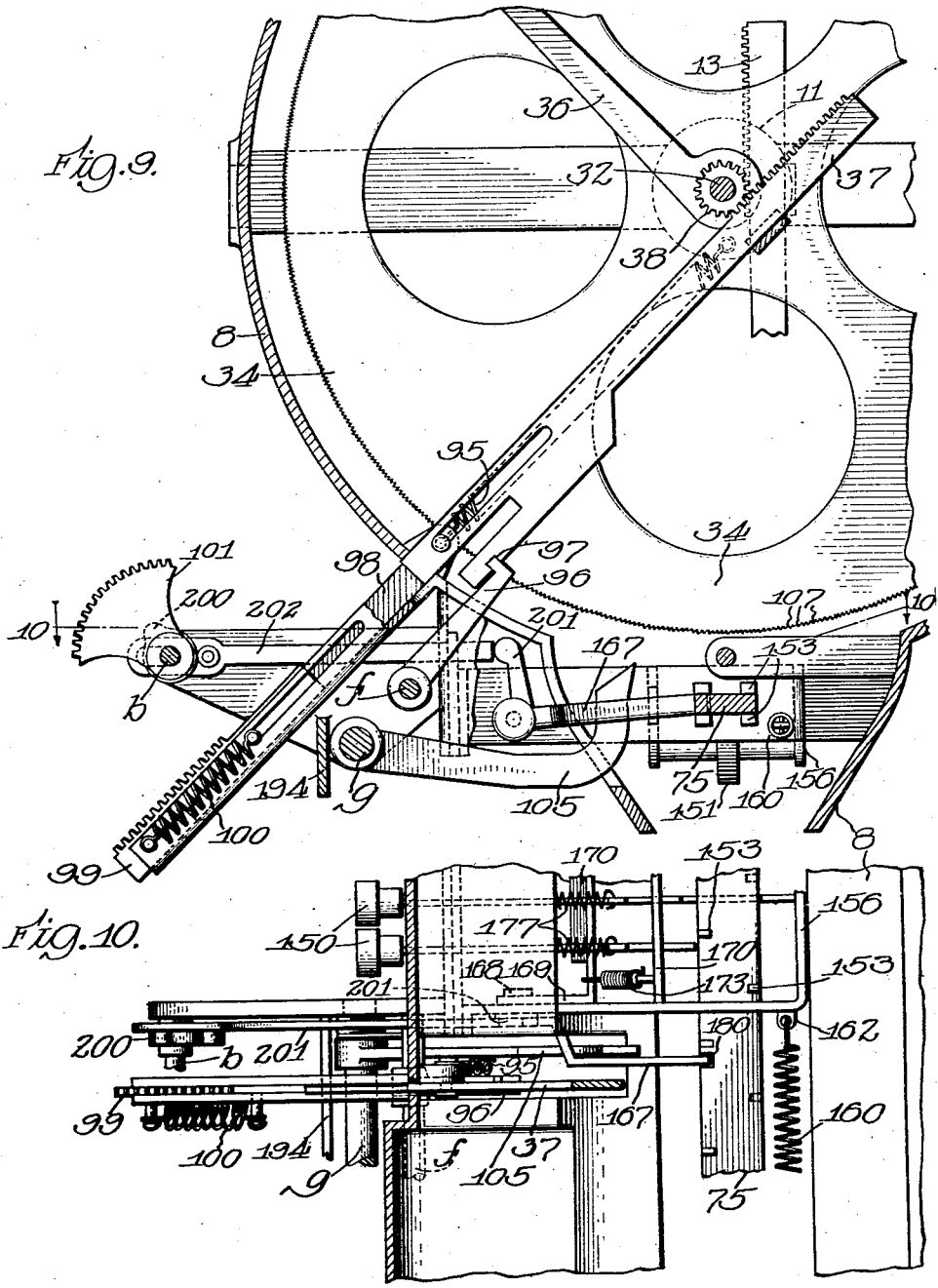

O. MALCHER.
COMPUTING AND RECORDING SCALE.
APPLICATION FILED MAR. 17, 1915.
1,335,068.
Patented Mar. 30, 1920.
10 SHEETS—SHEET 7.
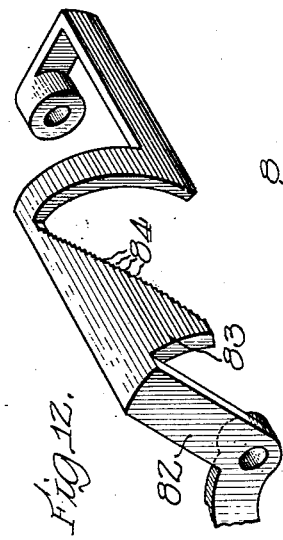
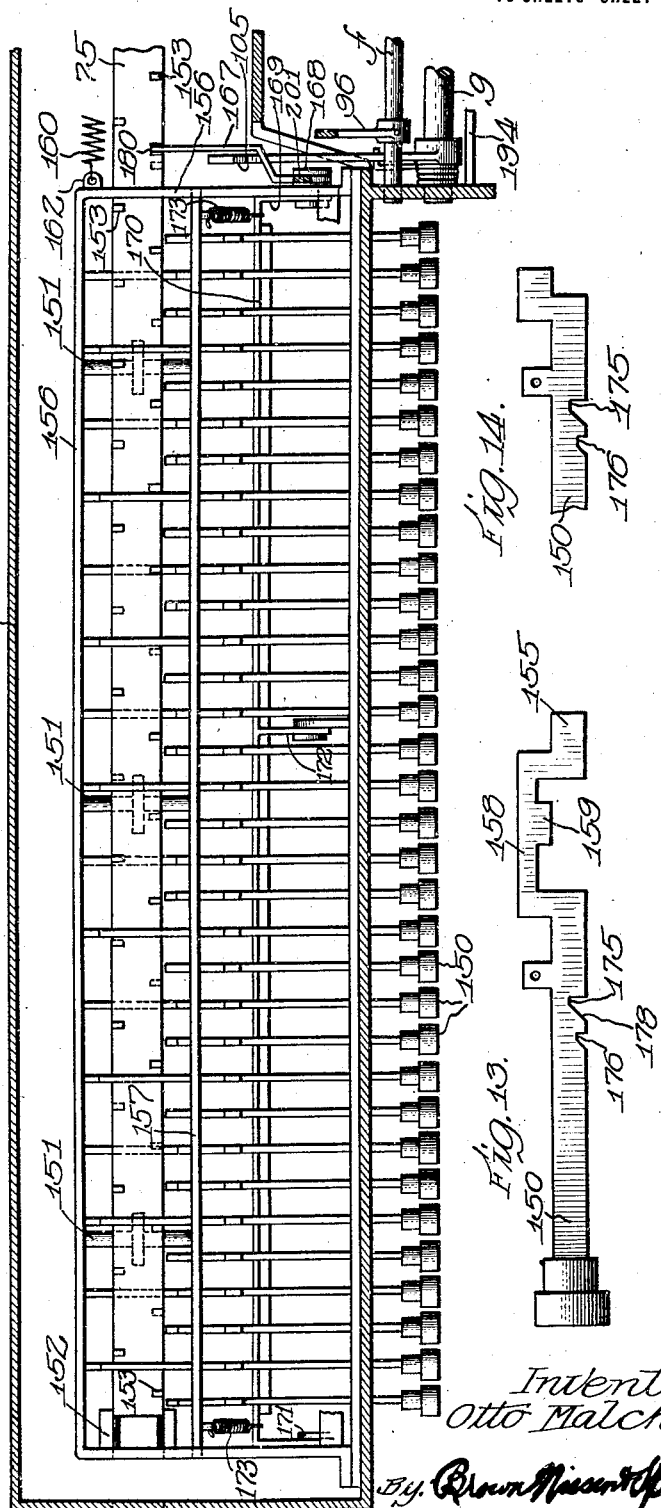
Inventor.
Otto Malcher O. MALCHER.
COMPUTING AND RECORDING SCALE.
APPLICATION FILED MAR. 17, 1915.
1,335,068.
Patented Mar. 30, 1920.
10 SHEETS—SHEET 8.
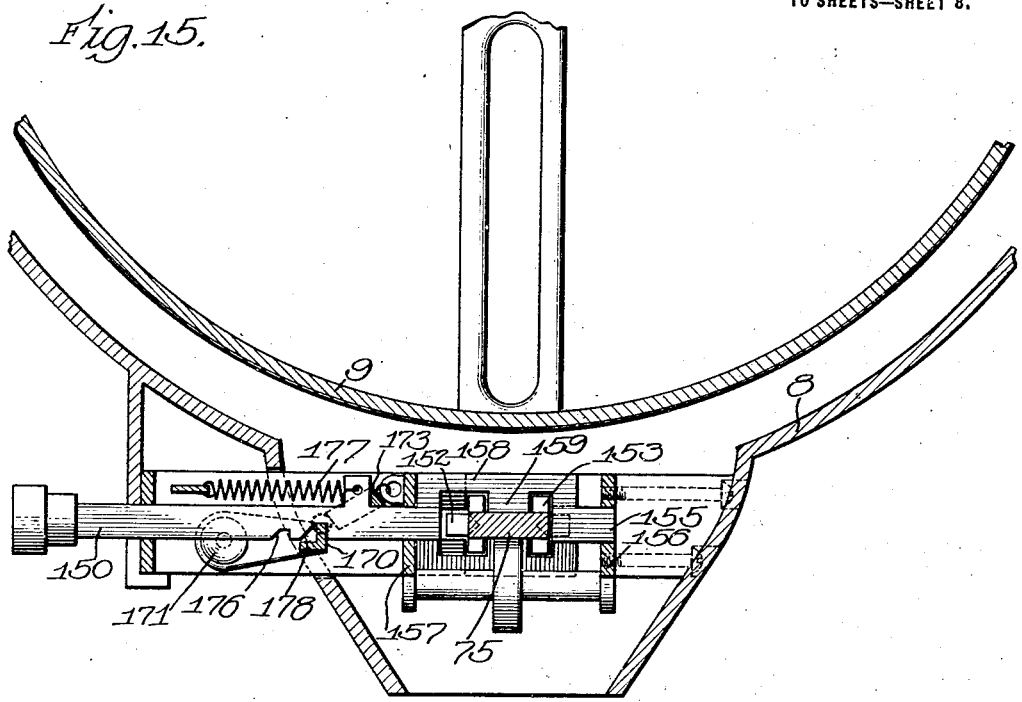
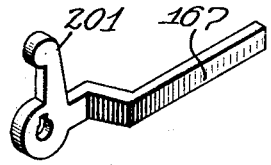
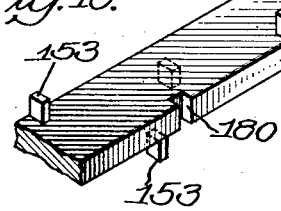
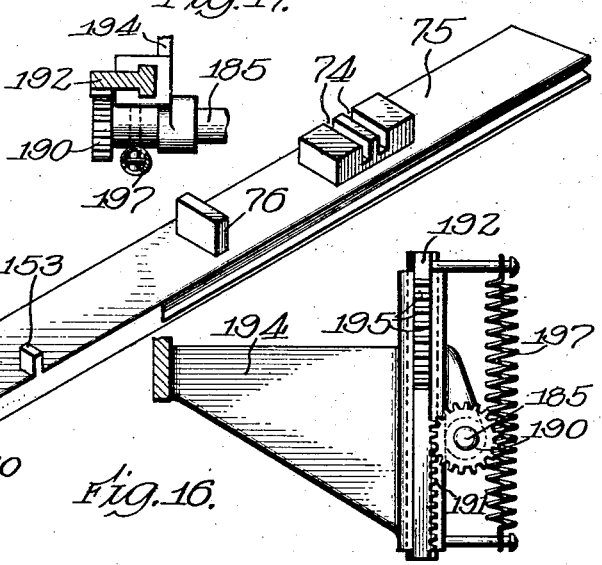
Witnesses:
G. W. Domarus Jr.
A. J. Crane
Inventor:
Otto Malcher
By Brown Nissen Sprinkle,
Attys.

O. MALCHER.
COMPUTING AND RECORDING SCALE.
APPLICATION FILED MAR. 17, 1915.
1,335,068.
Patented Mar. 30, 1920.
10 SHEETS—SHEET 9.
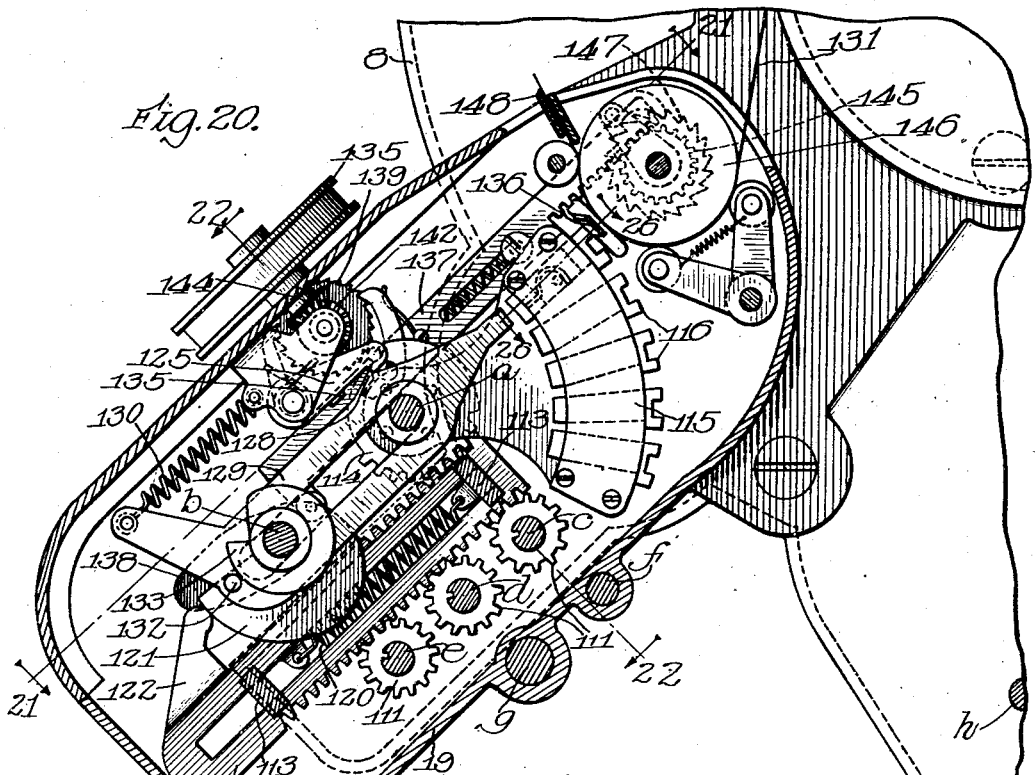
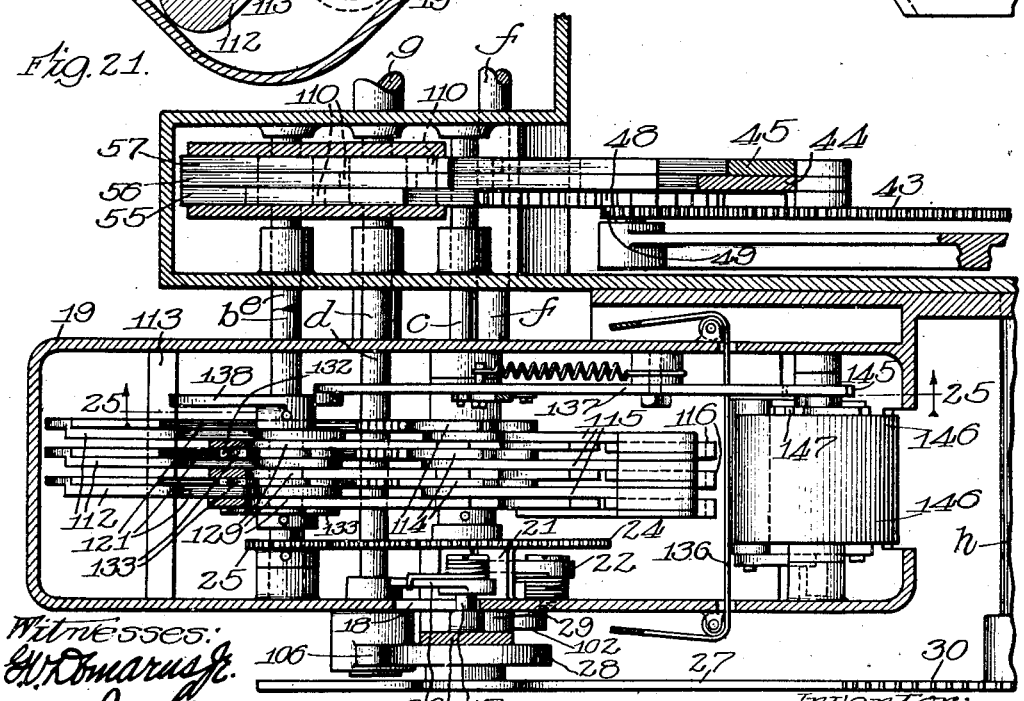

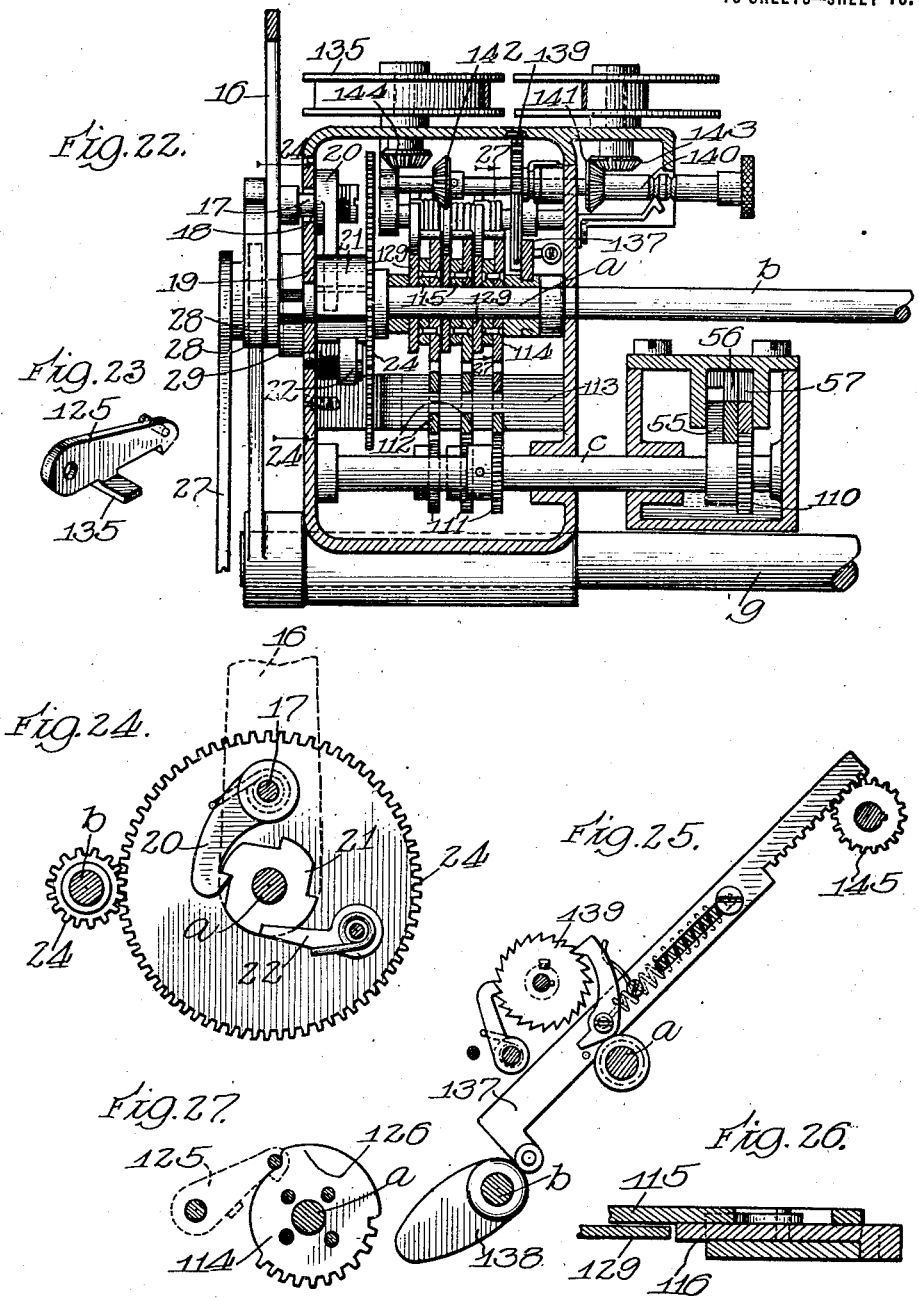

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

COMPUTING AND RECORDING SCALE.

1,335,068.   Specification of Letters Patent.   Patented Mar. 30, 1920.

Application filed March 17, 1915. Serial No. 14,986.

*To all whom it may concern:*

Be it known that I, OTTO MALCHER, a citizen of the United States, residing at Chicago, in the county of Cook and State of Illinois, have invented certain new and useful Improvements in Computing and Recording Scales, of which the following is a specification.

This invention relates to weighing scales for computing and recording the value of articles and is an improvement upon the form of computing and printing scale shown in my copending application Serial No. 2882 filed Jan. 18, 1915.

The invention consists substantially in the combination and arrangement hereinafter described, illustrated in the accompanying drawings, and more particularly set forth in the appended claims.

In the drawings:—

Fig. 2 is a fragmentary front elevational view of the scale shown in Fig. 1.

Fig. 3 is an elevational sectional view on line 3—3 of Fig. 2.

Figs. 4 and 5 are perspective views of stop racks which coöperate with the rotating stop wheel shown in Fig. 3.

Fig. 6 is a fragmentary front elevation showing the cone gear, stop wheel and coöperating parts.

Fig. 7 is a sectional view on line 7—7 of Fig. 6.

Figure 1:
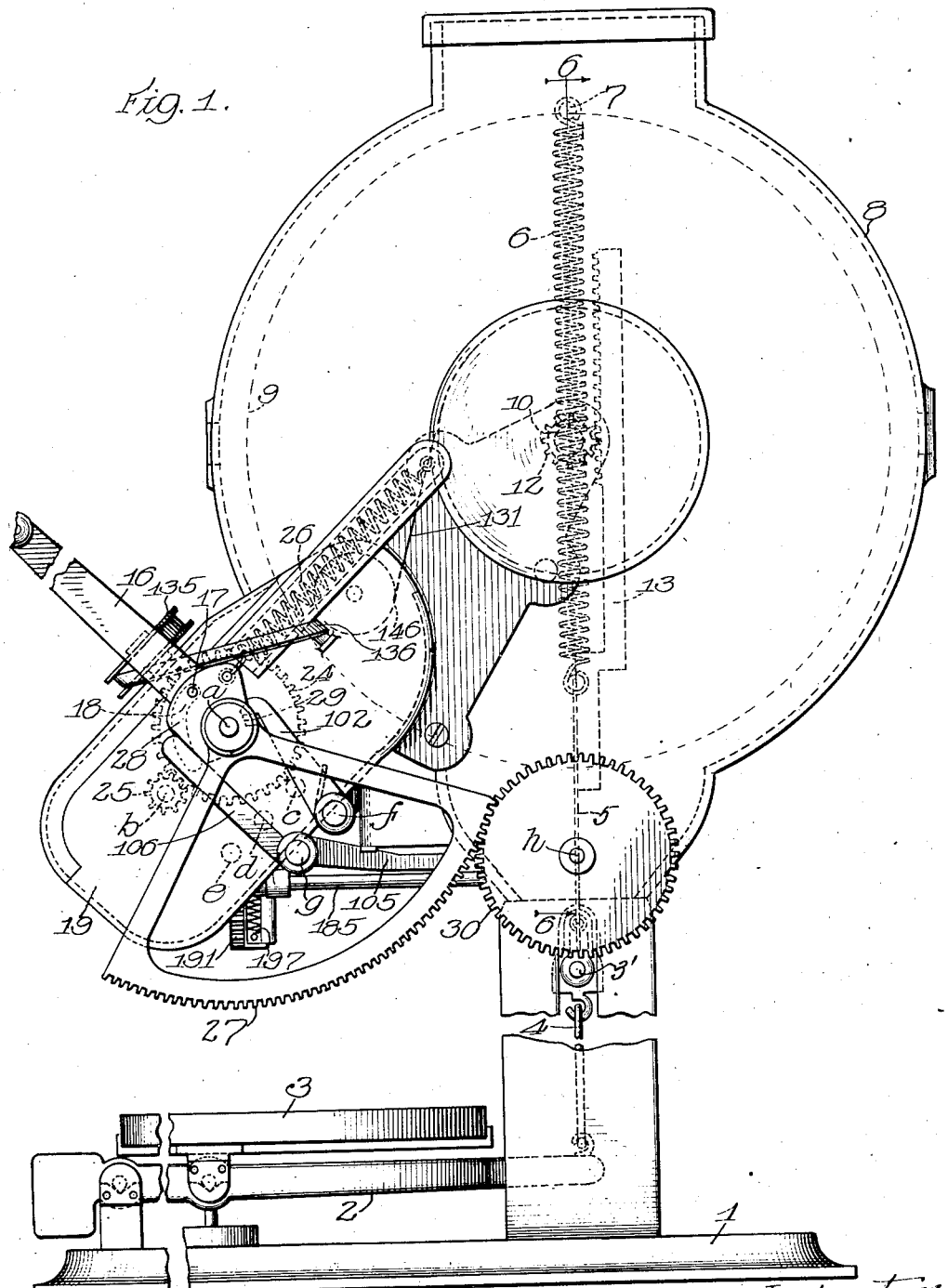
Figure 1 is an end elevational view of a weighing scale embodying my invention.

Figs. 8 and 8ª are detail views of the lock for the gear frame slide bar.

Fig. 9 is a vertical sectional view on line 9—9 of Fig. 2.

Fig. 10 is a fragmentary sectional plan view on line 10—10 of Fig. 9.

Fig. 11 is a fragmentary sectional plan view on line 11—11 of Fig. 2.

Fig. 12 is a detail perspective view of the gear frame rocker arm.

Figs. 13 and 14 are details of two of the price keys.

Fig. 15 is a fragmentary sectional elevation on line 15—15 of Fig. 2.

Fig. 16 is a sectional elevation on a plane indicated by line 16—16 of Fig. 7.

Fig. 17 is a sectional plan on line 17—17 of Fig. 7.

Fig. 18 is a fragmentary perspective view of one end of the gear frame slide bar.

Fig. 19 is a detail perspective view of the slide bar locking finger.

Fig. 20 is a sectional elevation on line 20—20 of Fig. 2.

Fig. 21 is a sectional view on line 21—21 of Fig. 20.

Fig. 22 is a sectional view on line 22—22 of Fig. 20.

Fig. 23 is a detail perspective of the printing hammer lock.

Fig. 24 is a section on line 24—24 of Fig. 22.

Fig. 25 is a section on line 25—25 of Fig. 21.

Fig. 26 is a section on line 26—26 of Fig. 20; and

Fig. 27 is a section on line 27—27 of Fig. 22.

In the accompanying drawing, the numeral 1 designates the base of a computing scale similar to those in common use in the trade at the present time. This scale includes a scale beam 2 and a pan 3 of ordinary construction. A rod 4 is secured to the end of the beam 2, Figs. 1 and 2, and extends upwardly and is connected with two cross bars 3' and 4'. The cross bar 3' is supported at its ends by upwardly extending links 5 which connect with springs 6 at their upper ends, which springs are supported at 7 near the upper part of the casing 8 in a way to counterbalance the weight of an article placed upon the pan 3. A drum 9 (see also Fig. 6) is carried by a shaft 10 supported in bearings 11 carried by the casing 8. Pinions 12 are attached to each end of the shaft 10 to rotate therewith, and racks 13 mesh with the pinions 12 to rotate the drum 9. The lower ends of the racks 13 are secured to the ends of the bar 4' and thus the racks 13 are constrained to move in unison with the rod 4 which supports the end of the scale beam. In this way the drum 9 will be rotated by a weight upon the scale pan 3 an amount proportional to the weight. The drum 9 has upon its surface a series of scales or graduations 14 corresponding to the various prices of articles to be weighed upon the scale and arranged to indicate the value of such articles in a manner which is well known in the art. The drum 9 also carries a double scale 15 adapted to indicate at points on opposite sides of the casing 8, the weight of the article upon the scale pan. As thus far described, the scale is the ordinary form of rotary drum computing scale.

As will be seen from Fig. 2 of the drawings, the casing 8 is extended to the right of the scale drum and carries the mechanism for ascertaining and recording the values indicated by the graduations 14. At the extreme right of the casing, as shown in Figs. 1, 2, 21, 22 and 24, is a hand crank 16. This hand crank is loosely mounted on the shaft $a$ and carries a projection 17 which extends through a slot 18 in the casing 19 which incloses the printing mechanism. Carried by the projection 17 within the casing 19 is a pawl 20 which coöperates with a ratchet 21 secured to the shaft $a$. A dog 22 is pivoted to the casing 19 and coöperates with the ratchet 21 to prevent backward movement of the ratchet. The slot 18 as will be seen from Fig. 1, extends through a quarter of a circumference and it will be seen from this figure and Figs. 21, 22 and 24, that when the hand crank 16 is moved forwardly or to the left in Fig. 1, no rotation of the shaft $a$ will be produced, but upon the return stroke the shaft $a$ will be given a quarter of a revolution. A gear 24 is secured to the shaft $a$ to rotate therewith and meshes with the pinion 25, secured to the shaft $b$. The gears 24 and 25 are of a proper ratio to produce one complete revolution of the shaft $b$ for each quarter turn of the shaft $a$. A spring 26 is fastened to the hand crank 16 and to the casing and serves to return the hand crank 16 after it has been drawn forwardly or to the left in Fig. 1. Secured to the hand crank 16 to rotate therewith, is a gear segment 27 and two cam members 28 and 29. Meshing with the gear segment 27 is a gear 30 carried by the shaft $h$. The gear 30 is of the proper size to be given three-quarters of a revolution for each reciprocation of the hand crank 16.

Mounted in the casing 8 at the right of the scale drum, as shown more clearly in Figs. 2, 6 and 7, is a cone gear 31. This gear is rigidly mounted on shaft 32, which in turn is free to rotate in bearings 33 carried by the casing in a manner similar to the bearings 11. The shaft 32 is coaxial with the shaft 10 and the ends of the two shafts are located near one another, as shown in Fig. 6. Secured to the end of the shaft 10, to rotate therewith, is a disk 34 which carries a stop 35, and secured to the shaft 32 is an arm 36 adapted to coöperate with the stop 35 to limit the rotation of the cone gear 31. When the shaft 10 is rotated by a weight on the scale pan, the stop 35 will be moved a distance proportional to the weight.

The disk 34 is then locked in this position by means to be described, and the shaft 32 is rotated by the rack member 37 and pinion 38, as will be later explained, until the arm 36 strikes the stop 35. In this way the cone gear 31 is rotated a distance proportional to the weight of an article upon the scale pan. The cone gear 31 is built up of a series of spur gears 39, one gear being provided for each price per unit weight for which the scale is designed to calculate values, and the circumferences of these gears bear the same ratio to one another as the various prices for which the scale is designed. At the extreme right of the casing 8, and coaxial with the drum 9 and cone gear 31, is a stop wheel 40, shown in Figs. 2, 3 and 6. The stop wheel 40 is mounted in a shaft 41, free to rotate in bearings 42 carried by the casing 8 and comprising a spur gear 43 and two stop rings 44 and 45 rigidly secured to the spur gear 43. Mounted to rotate on a stub shaft 46 carried by an arm 47 rigidly carried by the frame of the machine, is a third stop wheel 48 of smaller diameter than the wheels 44 and 45. The stop wheel 48 has rigid therewith a pinion 49 which meshes with the gear 43. The wheel 48 carries four stop members 50, each provided with ten stop shoulders 51. The stop wheel 44 carries a series of stop members 52, each provided with a series of ten stop shoulders 53. The stop wheel 45 carries a series of stop shoulders 54. There is one stop shoulder 54 for each of the stop members 52; and the gear 43 and the pinion 49 are so related to one another that the wheel 48 is given a quarter of a revolution, thus bringing ten stop shoulders 51 past a given point, during the movement of one of the shoulders 53 past the same point. It will thus be seen that if we consider the line connecting the centers of the shafts 41 and 46 as a starting point, ten of the shoulders 51 will pass this line for each of the shoulders 53, and ten of the shoulders 53 will pass this line for each of the shoulders or stops 54 which pass the same line. The stop ring 40 is adapted to be connected in a manner to be explained, with the cone gear 31, so that the wheel 48 will be rotated when positioned by an article upon the scale pan an amount sufficient to cause one of the stops 51 to pass the zero point or line connecting the centers referred to, for each cent's worth of the article upon the scale pan. It will be apparent, therefore, that one of the stops 53 will pass this zero point for each ten cents' worth of the same article, and one of the stops 54 will pass this point for each dollar's worth of the same article. Coöperating with the stop wheel 48, as shown in Figs. 3, 5 and 22, is a stop rack 55 adapted to have the end 55' thereof moved forwardly into contact with the stops 51, after each movement of the stop wheel 48, in a manner which will be described. Similar racks 56 and 57 are arranged to coöperate with the stops on the wheels 44 and 45. The outermost stop 51 corresponds to the zero position of the stop rack 55 and the other stops of each of the members 50 correspond to the digits ranging from 1 to 9. Since the wheel 48 is rotated a distance proportional to the value of an article upon the scale pan, and since one of the stops 51 passes the zero position of the wheel for each cent's worth of the article, it will be apparent that the stop rack 55, after each movement of the wheel, will move a distance before it strikes a stop 51 proportional to the digit in the units order of the number which represents the value of the article upon the scale pan. In like manner, the racks 56 and 57 are permitted to move distances proportional respectively to the digits in the tens and hundreds orders of the number representing the value of the article upon the scale pan.

The mechanism for connecting the cone gear 31 and the stop wheel 40, is best shown in Figs. 6, 7 and 12. Mounted to rotate in brackets 60 and 61, is a shaft 62 on which a gear frame 63 is mounted as shown in Figs. 6 and 7, and on which it is free to slide and oscillate. Extending longitudinally of the gear frame 63 is a shaft 64 provided at its ends with bevel gears 65 and 66. The bevel gear 65 meshes with a bevel gear 67 carried by the shaft 62 and free to slide thereon but held for rotation therewith in any well known manner as by a key and key way. The gear 66 meshes with a gear 68 at the opposite end of the frame 63 and rigidly carried on a shaft 69. The shaft 69 carries a pinion 70 adapted to be selectively placed in mesh with any one of the gears 39. A spring 71 normally tends to throw the gear frame 63 to the left as viewed in Fig. 7 and to bring the pinion 70 out of mesh with any of the gears 39. Secured to the bearing 72 which is on the frame 63 and surrounds the shaft 62, is a pair of flanges 73 which coöperate with grooves 74 in a slide 75 which is moved longitudinally of the shaft 62 in a manner to be described, in order to accurately locate the pinion 70 in position to coöperate with the proper spur gear 39. The slide 75 also carries a lug 76 which bears against the other bearing 77 of the gear frame 63. One end of the spring 71 bears against the slide 75 and the other end against the frame 63. The movement of the frame 63 outwardly away from the cone gear 31 under the influence of the spring 71, is limited by a stationary cam member 78 which coöperates with a cam roller 79 carried by an arm 80 secured to the frame 63. The cam surface 81 of the cam 78 is given a proper configuration to hold the pinion 70 a uniform distance from the spur gears 39 as the gear frame 63 is moved longitudinally along the shaft 62. A rocker arm or lever 82, Figs. 6, 7, and 12, is provided for forcing the frame 63 inwardly against the tension of the spring 71 when it is desired to bring the pinion 70 into mesh with one of the gears 39. This rocker arm is pivotally carried by the shaft 62 and carries a blade 83 having its edge provided with a series of notches 84 arranged along a line conforming to the configuration of the cam surface 81 of the stationary cam 78. One notch 84 is provided for each of the gears 39. The arm 85 of the lever 82 extends on the side of the shaft 62 opposite the blade 83 and carries a roller 86 adapted to coöperate with a cam 87 secured to the shaft $h$ as shown best in Fig. 7. Whenever the enlarged portion of the cam 87 contacts with the roller 86, it will give the lever 82 a rotary motion in a clockwise direction, as viewed in Fig. 7, and bring one of the notches 84 into contact with the arm 80 of the gear frame 63, and force the frame 63 to the right, as viewed in Fig. 7, against the tension of the spring 71 and thus bring the pinion 70 into mesh with one of the spur gears 39. A spring 71' is provided to force the arm 82 in a counter-clockwise direction, as shown in Fig. 7. The particular shoulder 84 which is brought into contact with the arm 80 will depend upon the position of the frame 63 longitudinally of the shaft 62, but the amount of rotation necessary to bring the pinion 70 into mesh with one of the gears 39 will always be the same, since the configuration of the cam surface 81 always holds the pinion 70 the same distance from the surface of the cone gear, and since the notches 84 are also arranged along a line corresponding to the cam surface 81. On the end of the shaft 62, in position to mesh with the gear 43, is a pinion 88. It will now be seen that the gear 43 may be selectively connected with any one of the gears 39 of the cone gear 31 through the pinion 88, the shafts 62, 64 and 69 and the pinion 70. As has been previously explained, the shaft 32 which carries the cone gear 31, is rotated a distance proportional to the weight of an article upon the scale pan. It is desirable to rotate the stop wheel 40 a distance proportional to the value of such an article, and it is apparent that the wheel 40 must therefore be rotated farther for an article of a given weight and of a high price, than it would be for an article of the same weight of a lower price. It is for this purpose that the series of different sized gears 39 is provided. In the present embodiment, gears 39 are provided for prices ranging from eight to forty cents per pound, and it is apparent that the range of prices may be changed to conform to the character of articles for which the scale is intended. The smaller gear shown in Fig. 6 is the eight cent gear, and is of the proper size to rotate the unit stop wheel 48 a distance corresponding to eight of the shoulders 51 for each pound placed upon the scale pan. The largest gear 39, shown in Fig. 6, is the forty cent gear, and is of the proper size to rotate the wheel 48 a distance corresponding to forty of the stops 51, or one complete revolution for each pound placed upon the scale pan. When this forty cent gear is being used and one pound is placed upon the scale pan, it will be apparent that the wheel 48 will be given one complete revolution and thus be brought back to its starting point, so that the stop rack 55 will be held in its zero position by the outermost stop on the wheel 48 when it is freed for forward movement. The wheel 44, however, will be moved by the pound weight a distance proportional to four of the stops 53, so that the stop rack 56 will be permitted to move forwardly a distance equal to the height of four of the stops 53 which is of course proportional to the digit in the tens column of the number representing the value of a pound at forty cents per pound. The intermediate spur gears correspondingly control the stop wheels for intermediate prices between eight and forty cents. To hold the stop wheel 40 rigidly in its initial position during the adjustment of the gear frame 63 a detent 90, Figs. 3 and 6, is pivoted to the casing and coöperates with a block 91 secured to the stop wheel 40. The spring 92 normally tends to force the dog 90 out of contact with the block 91. A cam 93 is secured to the shaft $h$ and coöperates with the roller 94 on the dog 90 to hold the dog in contact with on the block. The cam 93 is so timed that it permits the release of the wheel 40 at the proper time to be rotated by the rotation of the shaft 62. This occurs after the adjustment of the gear frame 63 to bring the pinion 70 into mesh with the proper gear 39.

The rotation of the cone gear 31 is produced by movement of the rack 37, best shown in Fig. 9. A spring 95 normally tends to draw the rack 37 to the left, as viewed in Fig. 9 and rotate the pinion 38 and the gear 31 and arm 36 in unison. The rack 37 is held in its forward position as shown in Fig. 9 against the tension of the spring 95 by a detent 96 coöperating with a notch 97 in the rack bar. The bar is free to slide in a guideway 98 when released by the detent 96. A second rack 99 is also mounted to slide in the guideway 98 and is held retracted by the spring 100, so that normally it does not interfere with the movement of the rack 37. The slide 99 is for returning the rack 37 to its original position after the operation of the device. The return movement is accomplished by the gear segment 101 carried by the shaft $b$ which, as has been previously explained, is given a complete revolution during the return stroke of the hand crank 16. As will be seen from Fig. 9, the gear segment 101 is adapted to engage the teeth on the rack 99 during the latter part of the rotation of the shaft $b$ and force the slide 99 forwardly a sufficient distance to return the rack 37 to its original position. The detent 96 is moved out of contact with the notch 97 by means of the arm 102, Fig. 1, which is carried at the end of the shaft $f$. This arm 102 coöperates with the pawl 29 and is forced to the right in Fig. 1, by the forward movement of the hand crank 16. This movement of the arm 102 rocks the shaft $f$ and so releases the detent 96 from the rack 37 and frees the rack to move under the influence of the spring 95 and so rotate the pinion and the cone gear carried therewith. The amount of this movement, as before explained, is limited by the arm 36 coöperating with the stop 35. The cam 29 is so proportioned that the release of the rack 37 takes place after the adjustment of the gear frame 63 to bring the pinion 70 into contact with the cone gear 31. The reason the gear segment 101 is provided with an additional coöperating rack 99 instead of teeth carried directly by the rack 37, is that the distance the rack 37 is moved depends upon the weight upon the scale pan, and if the segment 101 were caused to coöperate directly with teeth on the rack 37, it might happen that the rack 37 would not be in position for teeth carried thereon to mesh properly with the segment 101 when the segment was rotated to return the rack. This difficulty is avoided by providing the additional slide 99 which is always returned to the same position and which will return the rack 37 from whatever position it may have assumed during the rotation of the pinion 38. As before stated, the return of the rack 37 by the gear 101 occurs during the latter part of the return stroke of the hand crank 16 and it will be seen that at this time the cam 29 will be again in position to permit the detent 96 to be forced into the notch 97 by the spring pressing upon the arm 102. In this way, the rack 37 is locked in the position to which it is returned, by the segment 101.

Since the amount of rotation of the cone gear 31 is controlled by the stop 35 upon the disk 34 carried by the scale drum 9, it is desirable that the scale drum be held rigidly during the entire operation of the mechanism described. This is accomplished by a detent 105, Fig. 9, secured to the shaft $g$. As shown in Fig. 1, this shaft $g$ carries at its end an arm 106 which rests against the pawl 18 carried by the hand crank 16. An inspection of Fig. 1 will show that the very first effect of the rotation of the hand crank 16 will be to oscillate the arm 106 and the shaft $g$ and force the detent 105 into contact with the ratchet teeth 107 carried by the disk 34. The pawl 28 is so shaped that the detent 105 is held in contact with the teeth 107 during the entire forward and return stroke of the hand crank 16 and is only removed therefrom at the very close of the return stroke and after all of the other operations of the mechanism are completed.

The printing mechanism for recording the value of the article being weighed is controlled by the movement of the rack stops 55, 56 and 57. This mechanism is best shown in Figs. 20, 21 and 22, and is the same as that used in my copending application previously referred to. A series of shafts $c$, $d$ and $e$, Fig. 3, each carries a pinion 110 meshing with one of the stop racks. These shafts $c$, $d$ and $e$ extend into the casing 19 which incloses the printing mechanism and mounted on each of these shafts within the casing is a pinion 111. Three racks, 112, are slidingly mounted on cross bars 113 within the casing, one rack being provided for each of the pinions 111. Each rack 112 meshes with a mutilated gear 114 which carries a type-carrying segment 115. Mounted to slide in each of the segments 115 are a plurality of type bars 116 which are provided with numerals ranging from zero to nine. The stop rack 55 which is controlled by the units stop wheel, is connected with the lowest rack 112 in Fig. 21, which is the rack farthest to the right when the machine is viewed from the front and it prints the numerals in the units position on the ticket issued by the machine. In like manner, the rack 56 is connected with the rack 112 in the tens position, and the rack 57 is connected to the rack 112 in the hundreds position. The stop wheels and their coöperating stop racks and the type segments and their coöperating mechanism, are so proportioned that the movement of a stop rack a distance equal to the height of one of the stop shoulders on a stop wheel will rotate a type segment a sufficient distance to move the type bars carried thereby from one digit to the next. The upper type bar of each segment carries a zero and a one, and the lower carries an eight and a nine, and the intermediate bars carry the intermediate numerals in order. It will thus be seen that when a stop rack moves a distance proportional to the value designated by the digit in any one of the decimal orders of a number representing the value of an article, that digit will be brought into printing line on the type segment of the corresponding decimal order. The racks bars 112 are adapted to be moved by the springs 120 to rotate the shafts $c$, $d$ and $e$ and type segments 115. The racks 112 are held in their retracted position during the setting of the stop wheel 40 by the cams 121 secured to the shaft $b$ and bearing against the extensions 122 on the racks 112. As has been previously explained, the mechanism for setting the stop ring 40 is operated during the forward stroke of the hand crank 16. During the return stroke of the hand crank 16 the shaft $b$ is rotated and the first effect of this rotation will be to free the projections 122 from the cams 121 and permit the springs 120 to move the racks 112 and thus rotate the shafts $c$, $d$ and $e$ and force the rack stops 55, 56 and 57 forwardly until they are arrested by their corresponding stop wheels. This operation of course moves the type segments into position to set up in the printing mechanism the number representing the value of the article upon the scale pan. As is seen from Figs. 20 and 27, as soon as the mutilated gears 114 begin to rotate under the influence of the racks 112, they will release the catch members 125 by means of the cam portion 126 on the mutilated gears 114. These catch members coöperate with lugs 128 carried by printing hammers 129 mounted for sliding movement on shafts $a$ and $b$ and adapted to be drawn forward by springs 130 to strike the type bars 116 and make the impression upon the paper 131. The printing hammers, however, are not permitted to move forwardly until the lugs 132 are freed by the cams 133 carried by the shaft $b$. This takes place after the movement of the racks 112 to set up the number to be printed. In case the rack 112 in any particular decimal order has not been moved, the dog 125 will remain in engagement with the projection 128 and no number will be printed in that order unless a rack of a higher decimal order has rotated a mutilated gear and freed the catch of this higher order. In such case, the projections 135 will release all of the catch members 125 of lower decimal orders and zeros will then be printed in the lower orders in which no numbers have been set up. Ribbon spools 135 carry a ribbon 136 for coöperating with the type bars 116 and mechanism for feeding the ribbon is shown in Figs. 22 and 25. This mechanism includes a slide bar 137 adapted to be given a reciprocatory motion at the close of the rotation of the shaft $b$ by a cam 138 rigid with that shaft. This reciprocation of the bar 137 rotates the ratchet wheel 139 which drives shaft 140 carrying pinions 141 and 142 adapted to be alternately moved into mesh with corresponding pinions 143 and 144 carried by the ribbon spools 135. The direction of movement of the ribbon will depend upon the position of the shaft 140. The reciprocation of the rack 137 also rotates the pinion 145 and thus rotates the platen 146 to feed the paper 131 forwardly through the ratchet mechanism shown at 147 in Fig. 20 and which may be any well known form of one-way ratchet drive. This feeding of the paper takes place after the printing operation and moves the portion of the paper carrying the number printed thereon past the knife edge 148 against which the portion of the paper bearing the printed numeral may be torn off.

As before stated, the movement of the gear frame 63 to bring the pinion 70 in position to mesh with the proper gear 39, is accomplished by the slide 75. The movement of this slide is controlled by a keyboard carrying a series of price keys 150, Figs. 2 and 11. The slide 75 is supported by a series of rollers 151 and by V-shaped ways 152 located at each end of the slide, Figs. 6, 7, 8 and 11. The slide 75 has a series of lugs 153 located along the length of the slide and distributed in four different lines or series one series being located at each edge of the upper side of the bar and one series at each edge of the lower side of the bar. The keys 150 are made in four forms or sets, a form for each of the series of stops 153. Fig. 13 shows the form of one of these keys designed to coöperate with an upper stop on the rear side of the bar 75. Fig. 15 shows this same key in its operative position. This key has a projection 155 sliding in an opening in the bar 156 and the main body of the key slides in an opening in the bar 157. The key is offset at 158 to extend over the top of the slide 75 and the offset part has a downwardly extending lug 159 adapted to be moved into the path of motion of lug 153 on the upper rear edge of the slide 75 when the key is pressed inwardly or to the right, as shown in Fig. 15. It will be noticed that the key here shown will not interfere with the movement of any of the other lugs except the one on the upper rear portion of the slide. The other keys are shaped to coöperate with the other sets of lugs, those designed to coöperate with the lugs on the forward side of the slide 75 being shorter than those to coöperate with the lugs on the rear side. One of the shorter keys is shown in Fig. 14. The keys for operating on the lugs on the lower side of the slide are similar to those for coöperating with lugs on the upper side, but are placed in reverse position. One lug 153 is provided for each of the keys and beginning with the left in Fig. 11 each lug is set farther from its respective key than the preceding lug, the increase in the distance in each case being equal to the thickness of one of the gears 39. It will thus be seen that if the key 150 at the extreme left of Fig. 11 is pressed inwardly and the slide 75 moved to the left in that figure until it is stopped by the depressed key, the slide will move a distance equal to the thickness of one of the gears 39. This is just sufficient to bring the pinion 70 in positon to mesh with the first or smallest gear on the cone 31. If, instead of the end key, the second one is moved inwardly and the slide 75 moved to the left until stopped by the corresponding lug, the pinion 70 will be moved into position to mesh with the second gear on the cone 31. In this way the movement of the slide 75 may be stopped to bring the pinion 70 into position to coöperate with any one of the gears 39 on the cone 31. The keys 150, as shown in Fig. 2, bear numbers representing the prices corresponding to the particular gear opposite which the pinion 70 will be stopped when that particular key is depressed. The slide 75 has connected therewith a spring 160 by a pin 161, Fig. 6. The other end of the spring 160 is connected to the frame member 156 at 162. This spring normally tends to draw the slide 75 to the left, as viewed in the drawing. A pair of lugs 163 are secured to the bottom of the slide 75 and coöperate with the finger 164 carried by a disk 165 secured to the shaft $h$. The projection 164 has one of its edges beveled as at 166, shown best in Fig. 8$^a$. The projection 164 is adapted to hold the slide 75 against the tension of the spring 160, in its extreme position to the right. It will be evident that rotation of the shaft $h$ a sufficient distance, will release the slide 75 to move to the left under the influence of the spring 160. A second stop for holding the slide 75 against the tension of the spring 160 is shown at 167 in Fig. 11. A detail perspective of this stop is shown in Fig. 19. This stop arm 167 is rigidly secured to a pivot pin 168 carried by the frame 156 and free to oscillate therein. Secured to the pivot pin 168 on the opposite side of the frame member 156, is an arm 169 carrying a bar 170 which extends the full length of the key-board beneath the keys 150. Another pivotal support for the bar 170 is provided at 171 at the opposite end of the bar from 168 and a central pivotal support 172 may also be provided. Springs 173 are attached to the bar 170 and normally tend to draw it upwardly into contact with the lower surface of the keys 150, as shown in Fig. 15. Each of the keys 150 is provided with two notches 175 and 176, the notch 175 being deeper than the notch 176. Each key 150 is provided with a spring 177 which normally tends to draw the key outwardly. When the bar 170 is in contact with the notch 175 as shown in Fig. 15, the key is held in its inactive position. When pressure is placed upon the outer end of the key, the beveled edge 178 of the notch 175 forces the lock bar 170 downwardly against the tension of the spring 173 and permits the key to be forced inwardly into position to coöperate with its corresponding stop lug 153 on the slide 75. When the key reaches its innermost position, the bar 170 will be drawn upwardly by the springs 173 into the notch 176 and the key will be held in its inner position. At the same time that the bar 170 is forced downwardly by the beveled surface 178, the pivot pin 168 will be rotated and the stop arm 167 moved out of contact with the notch 180 on the slide 75. When the bar 170 enters the notch 176, the arm 167 is still held out of engagement with the notch 180 since the notch 176 is of less depth than the notch 175. It will be seen therefore that whenever a key is depressed, the arm 167 will be free from the slide 75 and when no key is depressed, the arm 167 will be in position to prevent movement of the slide 75. As has been stated, the forward movement of the hand crank 16 rotates the shaft *h* which rotation commences with the very first movement of the hand crank 16. The finger 164, however, is of sufficient width that a considerable rotation of the shaft *h* takes place before the lugs 163 are free from the finger 164, and the slide 75 is liberated to move under the influence of the spring 160. During this interval, the drum 9 is locked in position. When the finger 164 moves out of contact with the lugs 163, the slide 75 moves under the influence of the spring 160 until stopped by one of the keys 150 which has been depressed to indicate the price at which the article upon the scale pan is to be sold. This movement of the slide 75 as has been previously explained, brings the gear frame 63 opposite the gear 39 corresponding to the key depressed after the slide has been stopped. Further rotation of the shaft *h* will bring the cam 87 into contact with the cam roll 86 and force the pinion 70 into mesh with its corresponding gear in the manner previously described. This sets the device in position to perform the printing operation which takes place as has already been described, during the return stroke of the hand crank 16.

After the printing operation and also during the return stroke of the hand crank 16, it is necessary to return the parts to their original positions. The mechanism for returning the slide 75 and therewith the gear frame 63, is best shown in Figs. 6, 7, 16 and 17. Mounted transversely of the scale, is a shaft 185. Carried on the shaft 185 and free to rotate thereon, is a mutilated gear 186 in position to mesh with rack 187 carried on the lower side of the slide 75. Adjacent the gear 186 and secured to the shaft 185 to rotate therewith, is a disk 187 carrying a finger 188 adapted to contact with a lug 189 secured to the gear 186. It will be apparent from Fig. 6 that when the slide 75 moves to the left, the lug 189 will be moved about the shaft 185 toward the finger 188. If the slide 75 moves the greatest distance possible, the projection 189 will be brought substantially into contact with the finger 188. The end of the shaft 185 opposite that having the gear 186 carries a pinion 190 which meshes with teeth 191 on a slide 192 carried in a guide 193 secured to a projection 194 extending from the casing of the machine (see Figs. 2, 7, 16 and 17). The slide 192 also carries a series of teeth 195 adapted to mesh with the teeth on the gear segment 196 carried by the shaft *b*. A spring 197 normally draws the slide 192 downwardly to hold the shaft 185 and the finger 188 in the position shown in Fig. 6. During the latter part of the rotation of the shaft *b*, and after the printing operation has taken place, the gear segment 196 will mesh with the teeth 195 and lift the slide 192 upwardly thus rotating the shaft 185 and the finger 188 in a clock-wise direction, as viewed in Fig. 6. This rotation will bring the finger 188 into contact with the lug 189 independently of how far the slide 75 has rotated the gear 186 and the lug 189. Sufficient movement is given to the finger 188 by the gear segment 196 to return the gear 186 and consequently the rack 75, to their original positions. The parts are so timed that the rack will be returned before the projection 164 on the disk 165 has been returned to its upper position by the rotation of the shaft *h*. It will be necessary to hold the slide 75 in this retracted position until the finger 164 has entered between the lugs 163 on the slide. This is accomplished by the locking arm 167. It will be remembered, however, that the locking arm 167 is held out of engagement with the slide 75 by the bar 170 which is in contact with the notch 176 of the depressed key 150. To free this arm 167 therefore, it will be necessary to release the key 150 before the slide 75 has reached its initial position. This is accomplished by a cam 200 (see Fig. 9) carried on the shaft *b*. As will be seen from this figure, the arm 167 has attached thereto an upwardly extending member 201 which makes in effect a bell crank construction. A slide 202 is in position to coöperate with the arm 201 to force it forwardly at the same time forcing the arm 167 downwardly and oscillating the pivot 168 and the arm 169 and bar 170 carried thereby. This oscillation moves the bar 170 out of the notch 176 in the key 150 and permits the key to be withdrawn by the spring 177. It will be noticed from the shape of the cam 200 that the bar 201 is merely pushed forwardly for an instant and then allowed to return. This is sufficient to release the depressed key, after which the springs 173 will draw the bar 170 upwardly toward the deeper notches 175 in the keys 150. This will also swing the arm 167 upwardly against the lower face of the slide 75 and as soon as the slide has been drawn to its initial position by the action of the gear 186, this arm 167 will be snapped into position by the springs 173 in the notch 180 and the slide 75 will be locked in this position. The operation of the cam 200 is so timed that the depressed key 150 will be released after the rotation of the gear 186 by the shaft 185 has begun, so that the slide 75 will not at any time be left free to move under the influence of the spring 160. The release of the key must also occur before the rotation of the gear 186 is completed in order that the arm 167 is in position to move into contact with the notch 180 when the slide 75 reaches its extreme position. As has been previously stated, the final movement of the shaft $h$ brings the finger 164 in position between the lugs 163 to lock the slide in its retracted position. As has been pointed out, the finger 164 has one of its edges 166 beveled. The object of this beveled edge is to produce a wedging motion between the lug 163 and the finger 166 as the finger is moved into its final position, and thus give the slide 75 a slight additional movement to the right to free the arm 167 from pressure due to the spring 160. This is desirable in order that the arm 167 will not produce undue resistance to rotation of the pivot pin 168 the next time one of the keys 150 is depressed.

Before the return movement of the slide 75 begins, the shaft $h$ is rotated by the return stroke of the hand crank 16 to bring the low portion of the cam 87 into contact with the roller 86, and thus to permit the gear frame 63 to swing about the shaft 62 to disengage the pinion 70 from the cone gear 31. The return of the rack 37 by the segment 101 takes place before the gear frame 63 is moved to disengage the pinion 70 from the cone gear 31. The return of this rack 37, as previously described, returns the cone gear 31 to its original position and through the pinion 70 and shafts 64 and 62 returns the stop wheel 40 to its original position. After the stop wheel 40 has been returned to its original position and locked in this position by the detent 90 and the cam 93, the movement of the gear frame 63, as just described, takes place. Before the movement of the rack 37, to return the wheels 31 and 40 to their initial positions the cams 133 and the cams 121 have rotated sufficiently to return the printing hammers 129 and the racks 112 against the tension of their springs respectively. The return of the racks 112 rotates the shafts $c$, $d$ and $e$ and withdraws the rack stops 55, 56 and 57 from contact with their stop members to permit the return of the stop members by the movement of the rack 37 under the influence of the segment 101. The final act of restoration occurs when the arm 106 oscillates the shaft $g$ to withdraw the detent 105 from the disk 34. In this way all of the parts are restored to their initial positions and the device is ready for a second operation.

The operation of the various parts of the device has been described in connection with the description of the construction of those parts, and it is believed that the operation of the device as a whole will now be clear. It may be briefly stated as follows: The operator places upon the scale pan 3 the article which he is about to sell to a customer. He then presses one of the keys 150 representing the price of the article to be sold. This pressure of the key moves a stop into position to intercept the movement of the slide 75 to bring the pinion 70 into alinement with the proper gear 39. The setting of the key also moves the stop arm 167 out of contact with the slide 75 and leaves the slide in this respect free to move. If a wrong key is depressed, the pressure of the correct key subsequently will force the bar 170 out of contact with the notch in the previously depressed key and allow that key to spring back to its original position, and the key subsequently depressed will be held in position to intercept the slide 75. The operator now merely draws the handle 16 forwardly and allows it to return and a portion of the paper 131 moves upwardly past the knife edge 148 bearing thereon the price of the article upon the scale pan. It is thus seen that all the operator need to do is to place the article upon the scale pan, press the button representing the price of the article, pull the hand crank 16 forwardly and then tear off the strip of paper bearing the price of the article and hand it to the customer, who presents it to the cashier when he pays for his goods. The first effect of the forward movement of the hand crank 16 is to lock the scale drum 9 by means of the detent 105 in the position to which it has been moved by the weight upon the scale pan. The forward movement of the lever 16 rotates the shaft $h$ to first release the slide 75 which is then moved by its spring 160 until it is intercepted by the depressed key. The next effect of the rotation of the shaft $h$ is to force the lever 82 into contact with the arm 80 and thus rotate the gear frame 63 to bring the pinion 70 into mesh with one of the gears 39. Since each gear 39 always occupies the same initial position, and since the wheel 40 is also always locked in the same initial position by the detent 90, the gears 39 may be properly arranged upon the shaft 32 so that the teeth of the pinion 70 and the gears 39 will always properly mesh when the pinion 70 is swung into contact with one of the gears 39. After the gear 70 is thus brought into mesh with the proper gear 39, the detent 90 is moved out of contact with the stop wheel 40 and then the arm 102 is rocked by the cam 29 to release the rack 37 to rotate the cone gear 31 until it is stopped by the arm 36 and the projection 35 carried on the disk 34. This rotation of the cone gear 31 is, as has been explained, proportional to the weight of the article upon the scale pan and is transmitted to the stop wheel 40 which is thereby set in proper position to coöperate with the stop racks 55, 56 and 57. The hand crank 16 is now permitted to return under the influence of the spring 26. The return movement first releases the racks 112 which move forward under the influence of the springs 120 until they are checked by the rack stops 55, 56 and 57 contacting with their respective stop rings. This movement of the racks 112 rotates the type segments 115 into the proper positions to print the value of the article upon the scale pan. The printing hammers are then released by the movement of the cams 133 and the printing occurs. Further rotation of the shaft $b$ restores the various parts to their initial position and rotates the platen to feed the paper 131 and also moves the ribbon. The return of the parts is effected by the rotation of the shaft $b$ and the return rotation of the shaft $h$. The shaft $b$ carries the cams 133 and 121 for restoring the printing mechanism and this restoration occurs first. The cone gear 31 and the stop wheel 40 are then returned by the rack 37 and the segment 101; and the gear 40 is locked in its return position. The gear frame 63 is then rotated to move the pinion 70 out of contact with the gear 39 and the slide 75 is then returned by the segment 196 and mutilated gear 186. During the return movement of the slide 75 and just before it reaches its initial position, the arm 167 is oscillated to release the depressed key, and this arm, as soon as the slide 75 reaches its initial position, snaps into place to hold the latter in this position until the rotation of the shaft $h$ brings the finger 164 into contact with the lugs 163 on the slide 75 to lock the slide in its initial position. Finally the detent 105 is moved out of contact with the drum 9 and the scale is in readiness for a second operation.

What I claim is:

1. In a computing scale, a movable member, weighing mechanism for controlling said member, means for varying the amount of movement of said member incident to a given weight, a graduated stop device actuated by said member, and value indicating means controlled by said stop device.

2. In a computing scale, a member, means for moving said member a distance proportional to the weight of an article upon said scale, a graduated stop device arranged to be moved by said member, means for varying the ratio of the movements of said members to correspond to different prices for unit weight, and value indicating means controlled by said stop device.

3. In a computing scale, a member arranged to be moved by the weight of an article upon said scale, a wheel having graduated stops thereon arranged to be controlled by said member, means for causing said wheel to rotate varying distances for a given weight, said distances being proportional to prices per unit weight, and value indicating means having contact members for engaging said stops to control said value indicating means.

4. In a computing scale, a stop member, recording mechanism controlled by said stop member, means for moving said stop member, weighing mechanism for controlling said moving means and means for changing the ratio of movement between said stop member and said moving means.

5. In a computing scale, a member, means for moving said member a distance proportional to the weight of an article upon said scale, a second movable member having graduated stops thereon arranged to correspond to decimal orders, driving means connecting said members to drive the second from the first, and means for changing the ratio of movement of said members, contact members for engaging said stop, and recording mechanism controlled by said contact members.

6. In a computing scale, a member, means for moving said member a distance proportional to the weight of an article upon said scale, a movable stop member, gearing adapted to connect said movable members, and means for varying the ratio of said gearing to cause movements of said stop member proportional to the values per unit weight of different priced articles placed upon said scale and means coöperating with said stop member and controlled thereby for indicating computed values.

7. In a computing scale, a member, means for driving said member a distance proportional to the weight of an article upon said scale, a series of different sized gears adapted to be rotated by said member, a stepped wheel and means for selectively connecting said stepped wheel with said gears to be driven thereby, and value indicating mechanism having contact members for engaging said stepped wheel to control said mechanism.

8. In a computing scale, a member, means for moving said member a distance proportional to the weight of an article upon said scale, a series of different sized gears connected to said member to be driven thereby, a stop member having a plurality of sets of stops thereon, the stops of the different sets having decimal relation to one another, means for driving said stop member, and means for selectively connecting said driving means with said gears to cause different amounts of movement of said stop member for a given movement of said first-mentioned member.

9. In a computing scale, a series of gears of different sizes, means for rotating said gears an angular distance proportional to the weight of an article upon said scale, a movable member having graduated stops thereon, and means for selectively connecting said stop member with said gears to be driven thereby, and value indicating mechanism controlled by the graduated stops on said member.

10. In a computing scale, a member, means for moving said member a distance proportional to the weight of an article upon said scale, a series of different sized gears arranged to be controlled by said member, a movable stop member, a shaft for driving said movable stop member, a gear frame slidably mounted upon said shaft, a pinion carried by said gear frame at one side of the axis of said shaft and arranged to rotate said shaft, and means for sliding said gear frame along said shaft to selectively move said pinion into alinement with said first named gears.

11. In a computing scale, a cone gear composed of a series of rigidly connected gears of different sizes, means for rotating said cone gear an angular distance proportional to the weight of an article upon said scale, a movable stop member, a shaft for driving said stop member, a gear frame slidably mounted upon said shaft, a pinion carried by said gear frame and adapted to rotate said shaft, means for moving said gear frame along said shaft to bring said pinion selectively into alinement with the gears of said cone gear, and means for rotating said gear frame about said shaft to move said pinion into mesh with the gears of said cone gear.

12. In a computing scale, a cone gear, means for rotating said cone gear a distance proportional to the weight of an article upon said scale, a shaft, a frame slidable along said shaft, a pinion mounted on said frame and adapted to rotate said shaft, means for sliding said frame along said shaft, a cam for rotating said frame about said shaft to hold said pinion a uniform distance from said cone gear during the movement of said frame along said shaft, and computing mechanism controlled by said shaft.

13. In a computing scale, a cone gear, means for rotating said cone gear an angular distance proportional to the weight of an article upon said scale, a shaft, a frame mounted upon said shaft to slide and rotate thereon, a pinion carried by said frame and connected with said shaft to rotate the same, means for sliding said frame along said shaft to bring said pinion selectively into alinement with the gears of said cone gear, a cam for holding said pinion a uniform distance from said gears, means for moving said pinion into and out of mesh with said gears, and a stop member adapted to be driven by said shaft.

14. In a computing scale, a member, means for moving said member a distance proportional to the weight of an article upon said scale, a stop device operatively connected to said member to be driven thereby, said stop device comprising a plurality of stop-carrying members movable at different rates of speed, the rate of speed of each stop-carrying member being such that ten stops carried by said member are moved past a given point during the movement of one stop on the next adjacent member past the same given point.

15. In a computing scale, a member, means for moving said member a distance proportional to the weight of an article on said scale, a gear wheel adapted to be driven from said member, means for varying the ratio of movement of said member and said gear wheel, a stop member secured to said gear wheel to move in unison therewith and a second stop member driven by said gear wheel to move at a different rate from said first named stop member, and value indicating mechanism controlled by said stop members.

16. In a computing scale, a member, means for moving said member a distance proportional to the weight of an article on said scale, a stop member adapted to be driven by said movable member, and a second stop member adapted to be driven by said movable member but at a different rate of speed from said first stop member.

17. In a computing scale, a member, means for moving said member a distance proportional to the weight of an article upon said scale, a stop member adapted to be driven from said movable member, and a second stop member smaller than said first stop member and adapted to be driven from said movable member at a greater rate of speed than said first stop member.

18. In a computing scale, a movable member, weighing mechanism for controlling said member, a stop member arranged to be driven by said movable member, a second stop member arranged to be driven by said movable member but at a different rate of speed from said first stop member, and a recording device controlled by said stop members.

19. In a computing scale, a movable member, weighing mechanism for controlling said member, a stop member arranged to be moved by said movable member, a second stop member arranged to be moved by said movable member but at a different rate of speed from said first stop member, means for varying the ratio of movement between said movable member and said stop members, and a recording device controlled by said stop members.

20. In a computing scale, a movable member, weighing mechanism for controlling said member, a gear wheel adapted to be driven by said movable member, means varying the ratio of movement between said gear wheel and said movable member, a stop device adapted to be driven by said gear wheel, said stop device comprising a plurality of stop members some of said stop members adapted to be driven at a different rate of speed from other of said stop members, the ratio of movement of the stops on adjacent members past a fixed point being one to ten, and a recording device controlled by said stop members.

21. In a computing scale, a plurality of gear wheels of different diameters fixedly secured together to form a cone gear and to rotate in unison, weighing mechanism, means controlled by said weighing mechanism for rotating said gear, a pinion adapted to be moved along the face of said cone gear, means for maintaining said pinion a fixed distance from the face of said cone gear during said movement, means for selectively moving said pinion into mesh with any one of said gears forming said cone, a recording device, and means driven by said pinion for controlling said recording device.

22. In a computing scale, a member, means for moving said member a distance proportional to the weight of an article upon said scale, a cone gear arranged to be driven by said member, a pinion, a frame carrying said pinion, means for moving said frame to selectively place said pinion in alinement with the gears composing said cone, and means for rotating said frame to bring said pinion into mesh with the gear with which it alined.

23. In a computing scale, a movable member, weighing mechanism for controlling said member, a graduated member, gearing for transmitting motion from said movable member to said graduated member, means for changing the ratio of said gearing, and means for holding said graduated member stationary during the change of said gear ratio.

24. In a computing scale, a movable member, weighing mechanism for controlling said member, a recording device, a graduated member for controlling the movement of said recording device, means for transmitting movement from said movable member to said graduated member, said means being adjustable to vary the ratio of movement transmitted, and means for holding said graduated member stationary during the adjustment of said movement transmission means.

25. In a computing scale, a movable member, weighing mechanism for controlling said member, a stop member, means for transmitting motion from said movable member to said stop member, and a series of keys for controlling the ratio of motion thus transmitted, and value indicating mechanism having contact members for engaging said stop members to control said value indicating mechanism.

26. In a computing scale, a movable member, weighing mechanism for controlling said member, a stop member, recording mechanism controlled by said stop member, means for transmitting motion from said movable member to said stop member, and a series of keys for controlling the ratio of motion so transmitted.

27. In a computing scale, a movable member, weighing mechanism for controlling said member, a graduated member, recording mechanism controlled by said graduated member, a system of gearing for connecting said movable member and said graduated member and a series of keys for controlling the ratio of motion transmitted by said gearing.

28. In a computing scale, a movable member, weighing mechanism for controlling said member, a graduated member, recording mechanism controlled by said graduated member, gearing connecting said movable member and said graduated member, gear shifting means for controlling the ratio of movement transmitted by said gearing, and a series of keys for controlling said gear shifting means.

29. In a computing scale, a movable member, weighing mechanism for controlling said member, a second movable member, shiftable gearing for connecting said movable members, a slide for controlling the shifting of said gearing, and a series of keys for controlling the movement of said slide.

30. In a computing scale, a member, means for moving said member a distance proportional to the weight of an article upon said scale, a second movable member, motion transmission means connecting said movable members, means for varying the ratio of motion between said movable members, a slide for controlling said motion ratio, a series of price keys for controlling said slide to cause the movement of said second movable member for a given movement of said first movable member to be proportional to different prices represented by said price keys, and means for measuring the movement of said second movable member in terms of value.

31. In a computing scale, a movable member, weighing mechanism for controlling said member, recording mechanism, a movable member for controlling said recording mechanism, shiftable gearing for connecting said movable members, a slide for shifting said gearing, keys for controlling the movement of said slide, and means for restoring said slide and gearing to their initial positions after a gear shifting operation.

32. In a computing scale, a movable member, weighing mechanism for controlling said member, shiftable gearing for controlling the amount of movement of said member due to a given weight, a slide for shifting said gearing, keys for controlling the movement of said slide, a hand lever for controlling the movement of said movable member, and means operated by said hand lever for restoring said slide after the gear shifting operation.

33. In a computing scale, a movable member, weighing mechanism for controlling said member, a second movable member, recording mechanism controlled by said second movable member, motion transmission means connecting said movable members, a series of keys for controlling the ratio of motion between said movable members, and a lever for operating said movable members, motion transmission means and recording mechanism.

In testimony whereof I have signed my name to this specification, in the presence of two subscribing witnesses, on this 15th day of March A. D. 1915.

OTTO MALCHER.

Witnesses:
A. J. CRANE.
ARTHUR L. SPRINKLE.